May 7, 1946. A. RAPPL 2,399,652
MOTOR VEHICLE
Filed July 19, 1943 2 Sheets-Sheet 1

INVENTOR
ANTON RAPPL
BY
Bean, Brooks, Buckley & Bean
ATTORNEYS

May 7, 1946.  A. RAPPL  2,399,652
MOTOR VEHICLE
Filed July 19, 1943  2 Sheets-Sheet 2

INVENTOR
ANTON RAPPL
BY
Beau, Brooks, Buckley & Beau.
ATTORNEYS

Patented May 7, 1946

2,399,652

UNITED STATES PATENT OFFICE 2,399,652

MOTOR VEHICLE

Anton Rappl, Eggertsville, N. Y., assignor to Trico Products Corporation, Buffalo, N. Y.

Application July 19, 1943, Serial No. 495,265

9 Claims. (Cl. 15—250)

This invention relates to the motor vehicle art and particularly to the windshield and the cleaner therefor.

In the streamlining of motor vehicles the windshield has been developed to improve the field of vision. To this end it has been proposed to impart a curvilineal design to the windshield so as to widen the zone of vision and eliminate certain body frame members which heretofore have restricted vision. The use of a curved windshield also presents the problem of finding a satisfactory cleaner therefor.

The present invention has for its object to provide an improved curved windshield which will afford ample vision, and, further, to provide an efficient cleaner for maintaining clear the field of vision through the front portion of the windshield as well as through flanking side and top portions thereof.

Figure 1:
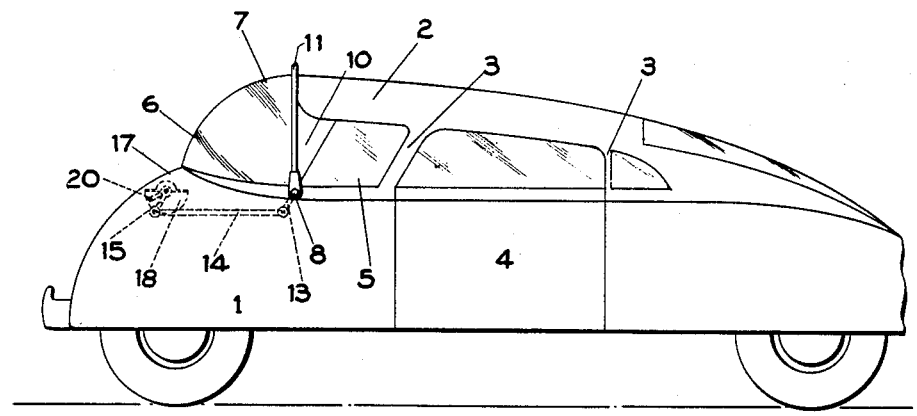
Fig. 1 is a side elevation of a motor vehicle embodying the present invention.

Referring more particularly to the drawings, the numeral 1 designates the body of the vehicle having an overhanging roof portion 2 supported by side columns 3 at opposite sides of the side doors 4, the latter being set backwardly from the driver's seat which will be disposed adjacent the side window 5.

Figure 2:
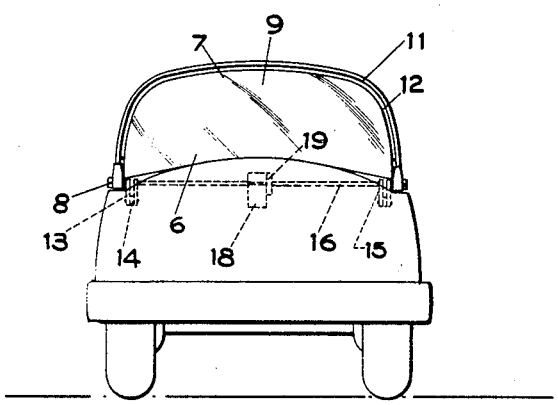
Fig. 2 is a front elevation thereof.
Figure 3:
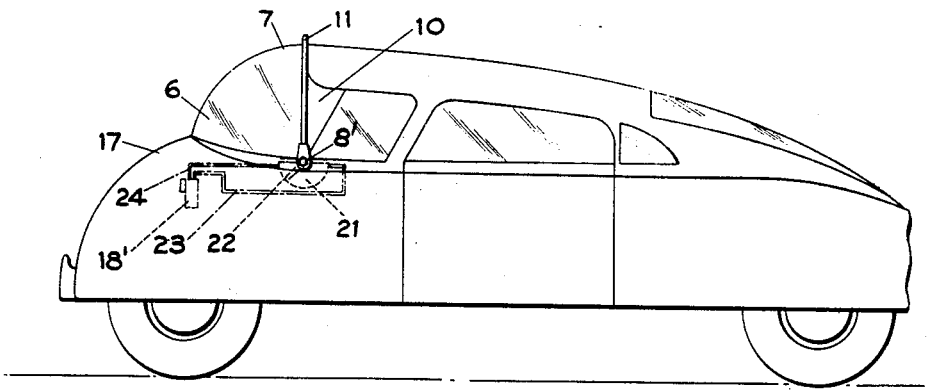
Fig. 3 is a view similar to Fig. 1 showing a modified cleaner embodiment.

The windshield comprises a frontal portion 6 merging into a roof or ceiling portion 7, the two portions having a cross sectional contour which is substantially concentric with the axis of wiper oscillation, on which axis is arranged the spaced rock shafts 8. The windshield may slope laterally in opposite directions from a high center, as shown in Fig. 2, and the frontal and roof portions of the windshield merge laterally into side wing portions 10. Preferably, this entire windshield section will be molded integrally throughout and may conveniently be shaped from a transparent plastic composition but which for convenience will herein be referred to as glass, a generic term.

For maintaining this symmetrically shaped windshield clean during rainy weather a generally bow-shaped wiper 11 is provided which conforms in curvature to the exterior surface of the windshield. The wiper carries a squeegee element 12 on its inner side in wiping contact with the glass so that upon the oscillation of the wiper the entire windshield will be cleaned, the wiper moving back and forth between the frontal portion and the roof portion and extending down over the side portions. The bow 11 is fixed at each end on the rock shafts 8 journaled in bearings at the opposite sides of the vehicle, and fixed to each rock shaft is a rocker arm 13 connected by a link 14 to a second rocker arm 15 extending from a drive rock shaft 16. This power shaft is journaled beneath and concealed by the cowl portion 17 and is adapted to be oscillated by a motor 18. The motor may be of the vane type, such as is shown in Patent No. 1,562,122 granted to John R. Oishei on November 17, 1925, having automatic valve mechanism 19 for reversing the application of fluid to the vane piston 20, the power shaft 16 extending through the motor and having the piston vane fixed directly thereon.

From the foregoing it will be observed that the operation of the motor will rock the arms 15 and this motion will be transmitted by the side links 14 to the rocker arms 13 for imparting oscillatory movement to the wiper 11.

Figure 4:
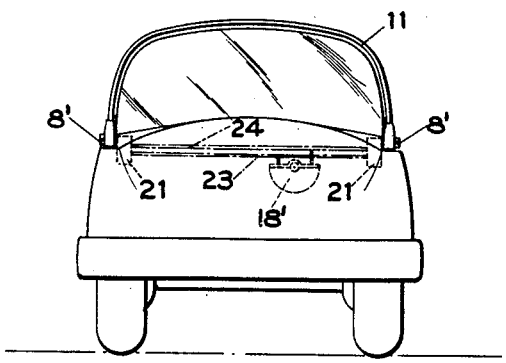
Fig. 4 is a front elevation of the embodiment depicted in Fig. 3.

In the modification the two rock shafts 8' constitute the shafts of individual motors 21 and the piston 22 of these motors may be connected directly to the rock shafts or geared thereto in any suitable manner. In order to synchronize the two motors 21, as well as support the bow-shaped wiper 11 against weaving or twisting during oscillation, the two motors are interconnected. This may be accomplished in any suitable manner such as is shown in Fig. 4 wherein a controlling or master motor 18' (similar in design as motor 18) has its chamber portions on the opposite sides of its piston communicating through conduits 23 and 24 with respective side chamber portions of the dependent motors 21. Since the dependent motors rely upon the master motor 18' for the reversal of the fluid differential they will be without individual automatic valve mechanism and will comprise merely the motor chambers and the vane pistons connected to the rock shafts 8'.

The windshield affords the operator of the vehicles ample field of vision which is free from any vision obscuring structural elements of the vehicle body. The extensive field of vision is maintained clear of vision obscuring matter by a wiper which conforms to the concentric portions of the windshield.

While the invention has been described in detail, it is not intended thereby to restrict the invention since the inventive principles herein involved are capable of assuming other physical embodiment without departing from the spirit of the invention or the scope of the appended claims.

I claim:

1. A motor vehicle having a windshield comprising an integral insert formed with frontal and roof portions flanked by side wings, the frontal and roof portions being shaped in an arc concentric to an axis extending transversely of the motor vehicle, bow-shaped wiper means journaled on such axis for oscillatory movement, the shape of the bow conforming substantially to the surface of the windshield for wiping the frontal, roof and side wing portions thereof, coaxial rock shafts journaled in the side of the vehicle on the axis of oscillation and supporting the wiper means, and means acting in like manner against the opposite ends of the bow-shaped wiper means for oscillating the latter.

2. A motor vehicle having a windshield comprising an integral insert formed with frontal, roof, and side wing portions, the frontal and roof portions merging into one another and jointly being shaped concentrically about an axis extending transversely of the motor vehicle, and bow-shaped wiper means journaled substantially on such axis for oscillatory movement, the shape of the bow conforming substantially to the surface of the windshield for wiping the frontal, roof, and side wing portions thereof.

3. A motor vehicle having a windshield comprising an integral insert formed with frontal and roof portions having side wing extensions, the frontal and roof portions merging into each other and being of the same radius, bow-shaped wiper means journaled on the axis of generation of the frontal and roof portions for oscillatory movement, the shape of the bow conforming substantially to the surface of the windshield for wiping the frontal, roof and side wing portions thereof, coaxial rock shafts journaled in the side of the vehicle on the axis of oscillation and supporting the wiper means, and a source of power operatively connected to the rock shafts.

4. A motor vehicle having a windshield comprising an integral insert formed with frontal and roof portions flanked by lateral wing extensions, the frontal and roof portions adjoining each other and being shaped about an arc concentric to an axis extending transversely of the motor vehicle, bow-shaped wiper means journaled substantially on such axis for oscillatory movement, the shape of the bow conforming substantially to the surface of the windshield for wiping the frontal roof and side wing portions thereof, coaxial rock shafts journaled in the side of the vehicle on the axis of oscillation and supporting the wiper means, a member fixed on each shaft for rocking the latter, and a common remote operator for the two shaft carried members operatively connected thereto.

5. A motor vehicle having a windshield comprising an integral insert formed with frontal and roof portions, said portions merging into each other about an arc concentric to an axis extending transversely of the motor vehicle, a rock shaft journaled on such axis, means for oscillating the shaft, and wiper means carried by the shaft and extending radially and thence over the adjacent frontal and roof portions.

6. A motor vehicle having a windshield comprising an integral insert formed with frontal and roof portions having side wings the frontal and roof portions merging into each other about an arc concentric to an axis extending transversely of the motor vehicle, bow-shaped wiper means journaled substantially on such axis for oscillatory movement, the shape of the bow conforming substantially to the surface of the windshield for wiping the frontal roof and side wing portions thereof, coaxial rock shafts journaled in the side of the vehicle on the axis of oscillation and supporting the wiper means, and drive means operable to oscillate said wiper means.

7. A motor vehicle having a windshield comprising an integral insert formed with frontal and roof portions flanked by lateral wing extensions, the frontal and roof portions adjoining each other and being shaped about an arc concentric to an axis extending transversely of the motor vehicle, bow-shaped wiper means journaled substantially on such axis for oscillatory movement, the shape of the bow conforming substantially to the surface of the windshield for wiping the frontal roof and side wing portions thereof, coaxial rock shafts journaled in the side of the vehicle on the axis of oscillation and supporting the wiper means, a member fixed on each shaft for rocking the latter, a transverse drive shaft, means for rocking the latter, and means operatively connecting the drive shaft to the rock shaft carried member.

8. A motor vehicle having a windshield comprising an integral insert formed with frontal and roof portions flanked by lateral wing extensions, the frontal and roof portions adjoining each other and being shaped about an arc concentric to an axis extending transversely of the motor vehicle, bow-shaped wiper means journaled substantially on such axis for oscillatory movement, the shape of the bow conforming substantially to the surface of the windshield for wiping the frontal roof and side wing portions thereof, coaxial rock shafts journaled in the side of the vehicle on the axis of oscillation and supporting the wiper means, a member fixed on each shaft for rocking the latter, and means operable to actuate said shaft rocking members.

9. A motor vehicle having a windshield with a frontal portion shaped about an arc substantially concentric to an axis extending transversely of the motor vehicle, a bow-shaped member journaled on such axis for up and down oscillatory movement, said bow-shaped member having a part angularly extending over the frontal portion and supporting wiper means in wiping contact with such curved frontal portion for wiping the same, and means operatively connected to the bow-shaped member for so oscillating the same.

ANTON RAPPL.